United States Patent Office 3,289,476
Patented Dec. 6, 1966

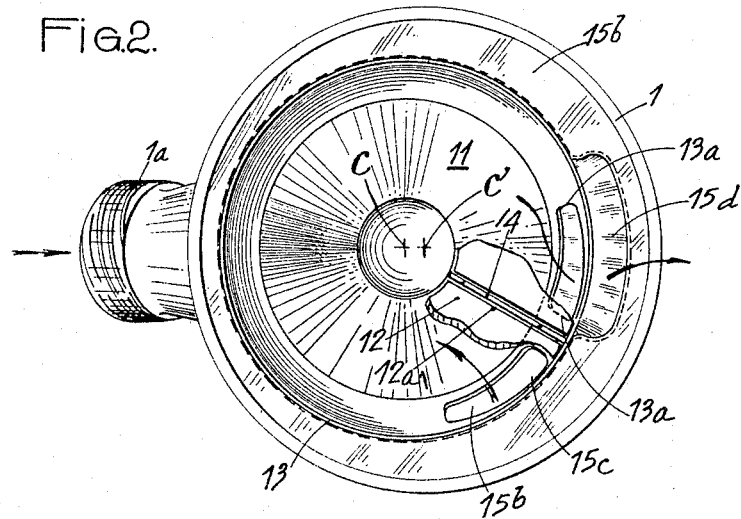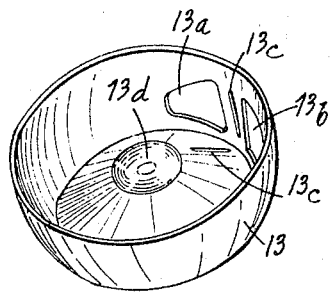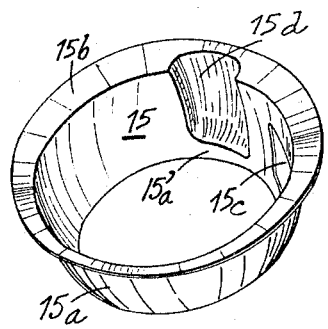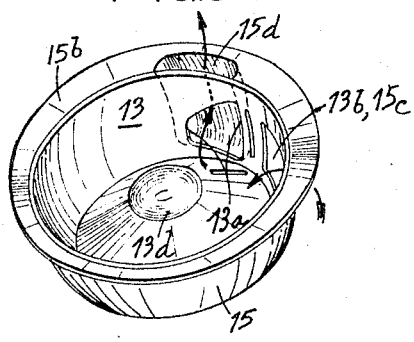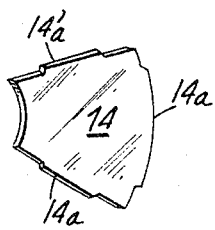

3,289,476
OSCILLATING DISC LIQUID METER
Alfred Jacques Marius Brette, Montrouge, France, assignor to Compagnie des Compteurs, Paris, France, a company of France
Filed Mar. 18, 1964, Ser. No. 352,897
Claims priority, application France, Mar. 25, 1963, 929,086, Patent 1,360,250
10 Claims. (Cl. 73—258)

The present invention relates to improvements in oscillating disc liquid meters of the type having a cone-shaped disc that undergoes movement.

It is known that the metering chamber of these meters, inside of which the disc oscillates, requires accurate and expensive machining. This machining is done by a metal shaving operation and presents particular difficulties when the metering bowl is made of a non-metallic material, such as ebonite, for instance, for in this case, it is necessary to machine said bowl by grinding.

It is also known that non-metallic materials such as ebonite, preferably used for making metering bowls of volumeric meters, owing to their properties of being resistant to scale deposits, are not usable for hot water meters, owing to their high expansion coefficient.

It is an object of the present invention to provide a metering bowl for oscillating disc liquid meters and preferably, with a cone-shaped disc, said bowl being made from stainless steel by a stamping process, so, on the one hand, to obviate the machining disadvantages, and on the other hand, to be utilizable in a cold or hot water meter, and even in a corrosive liquid meter. Actually, stainless steel is resistant to scale deposit and has an expansion coefficient compatible with the clearances permissible in a hot water meter, while being well adapted to stamping operations.

The invention also has for an object to enable easy communication between the outlet opening of the metering bowl and the outlet piping of the meter chamber. To this end, the invention provides a metal sheet casing, obtained by stamping, surrounding the metering bowl and including, on the one hand, a cavity placed opposite the output opening of said metering bowl and communicating with the outlet piping of the chamber, and on the other hand, a flange which forms a separating partition between the upstream and downstream parts of the meter. By means of this casing, it becomes possible to provide a meter chamber without any complicated internal partitioning. Under these conditions, a meter can be made whose chamber includes two hemispherical shells each equipped with a branch piping.

The present invention has also for its object to provide an oscillating disc liquid meter, preferably with a cone-shaped disc, characterized in that the metering bowl is formed, on the one hand, by an element produced by stamping, preferably made from stainless steel and having, in a manner known in itself an inlet and outlet opening, on either side of a diaphragm, and on the other hand, a metal casing externally surrounding the bowl, this casing being also obtained by stamping and having a cavity facing the outlet opening of said bowl and communicating with the outlet piping of the chamber through a radial flange forming a separating partition between the upstream and downstream parts of the meter.

Other characteristics will be revealed by the following description and attached drawings, given by way of non-restrictive examples.

FIGURE 2 shows a top view of the metering box inside the chamber of the meter, seen open (the part of the chamber or casing including the totalizator, the oscillating disc being removed).

FIGURE 3 shows a perspective view of the stamped bowl forming the metering box.

FIGURE 4 is a perspective view of the casing adapted to surround the bowl shown in FIG. 3.

FIGURE 5 is a perspective view of the bowl and casing assembled together.

FIGURE 6 is a perspective view of a particular part forming a diaphragm in the meter.

Figure 1:
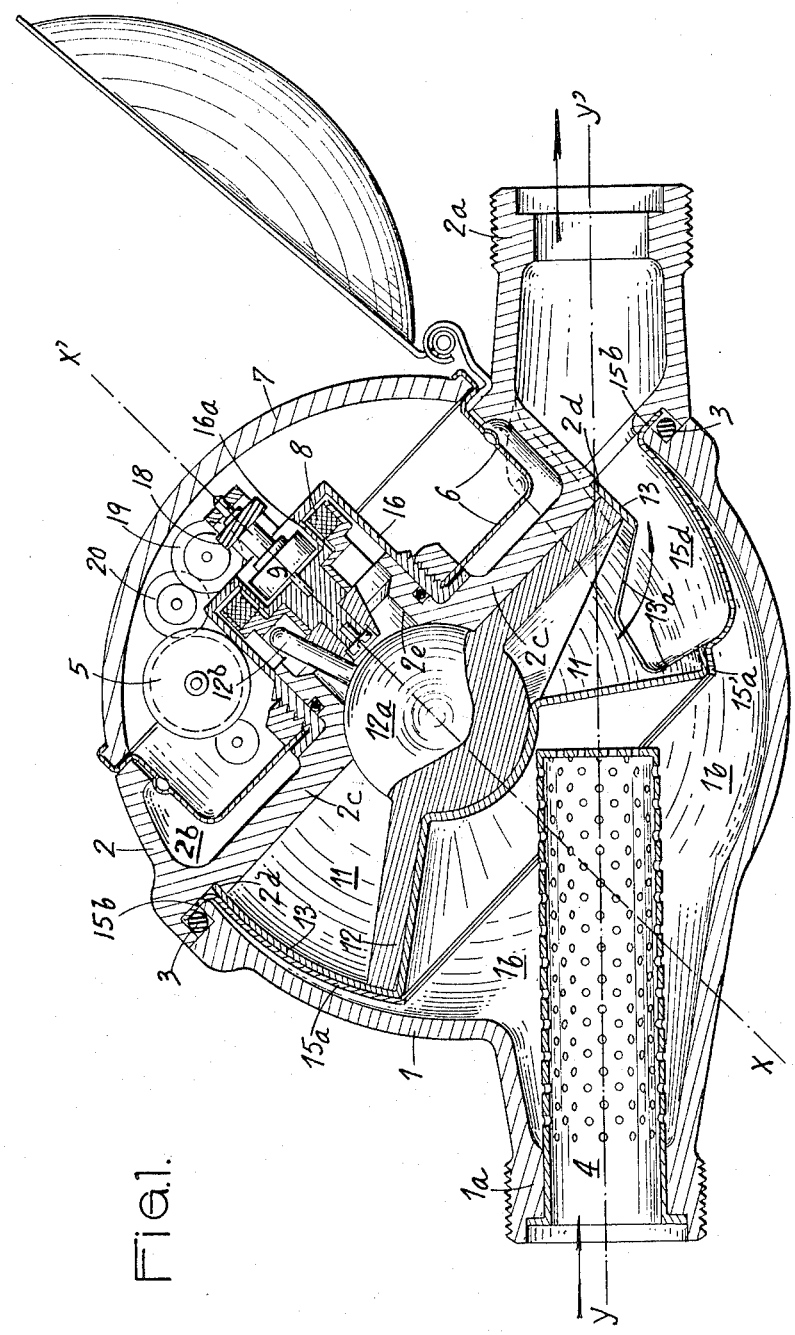
FIGURE 1 shows an embodiment of the meter according to the present invention taken along a section passing through the axis of the inlet and outlet piping of the chamber of the meter as well as through the oscillation center of the disc.

In the form of embodiment shown in the drawings, 1 and 2 denote two hemispheric shells forming the chamber or casing of the meter. The shells 1 and 2 respectively include pipings 1a, 2a both placed in alignment along the same axis y, y'. The axis x-x' around which the disc 12 oscillates while having a nutation movement, makes an acute angle, at 45° for example, with the axis y-y'.

Both shells 1 and 2 are assembled by any suitable means such as screws (not shown), the fluid-tightness being ensured by a seal 3. Piping 1a (the inlet piping) is in communication, by means of a filter 4, with a cavity 1b defined inside shell 1.

Reference number 11 denotes the metering chamber, within which oscillates the conical disc 12. Said chamber 11 is defined, on the one hand, by a bowl 13 whose internal surface has a shape corresponding to the external part of the volume produced by the disc 12 during its oscillation, and on the other hand, by the flat wall 2c of the shell 2. The bowl 13 is centered by a shoulder 2d of the wall 2c.

A totalizing mechanism 5 is placed in a fluid-tight enclosure disposed in the cavity 2b defined inside shell 2. This enclosure comprises a casing 6, a central housing 16 and a semi-spherical shaped glass bowl 7.

The wall 2c of shell 2 has a concavity at its central part for guidingly accommodating the spherical hub 12a of disc 12. This concavity communicates with a central opening 2e of cylindrical shape, allowing the passage of a catch-pin 12b integral with the hub 12a of disc 12. During its nutation movement around the oscillation axis x-x', the catch-pin 12b causes the totalizator 5 to be driven through a gear-train 18, 19 and 20, extending through the wall 16a of housing 16, by a known magnetic driving device the construction of which forms no part of the invention. This device is schematically shown in FIG. 1 by a radially magnetized ring 8, driven by the catch-pin 12b, and a disc 9, also radially magnetized, which drives the toothed wheels 18, 19, 20 and the totalizator 5.

The bowl 13 (FIG. 3) preferably made from stainless steel, is obtained by stamping, and has openings 13a and 13b. 13a denotes the outlet opening for the metered liquid, whereas 13b denotes the inlet opening. Moreover, the bowl has two slots 13c for affixing a small plate 14 constituting a diaphragm (FIGS. 2 and 6) which is provided with tongues 14a intended to penetrate into the slots 13c. The diaphragm 14 also comprises a tongue 14'a adapted to penetrate into a slot (not shown) provided in the flat wall 2c of shell 2. Also, the central part 13d of the bowl 13 bottom has a concave shape with spherical generatrices for guidingly accommodating the spherical hub 12a of disc 12.

As shown in FIG. 2, disc 12 has a slot 12a₁ whose edges are provided for sliding on the small plate 14 which, in addition to functioning as a diaphragm between the openings 13a, 13b, acts as a guide for the disc 12 which is thus prevented from revolving about its own axis.

Bowl 13 is surrounded by a casing 15 as shown in FIGS. 1, 2 and 5. This casing, shown in perspective in FIG. 4, is preferably made of sheet metal and produced by stamping. It includes a wall 15a surrounding bowl 13 on the periphery thereof and this wall has an opening 15c having a shape and surface equal to those of the inlet opening 13b of bowl 13. Additionally, the wall 15a of casing 15 has a cavity 15d. The wall 15 is extended by an annular flange 15b of variable width. The center C' (FIG. 2) of the external peripheral edge of flange 15b does not coincide with the center C of bowl 13 but is offset towards the cavity 13d. This arrangement is intended to avoid increasing the external diameter of the meter shells 1, 2.

When the bowl 13 is placed inside casing 15 (as shown in FIG. 5) the outlet opening 13a of said bowl is placed opposite the cavity 15d in the casing. As already stated, the flange 15b is intended to act as a separating partition between the upstream and downstream parts of the meter. To this end, this flange bears on the seal 3 when bowl 13 and casing 15 are mounted within the meter chamber (FIG. 1). It can be seen also in this figure that the shoulder 2d of wall 2c bears on the upper edge of the bowl 13 in order to maintain the latter against the wall 15a of casing 15.

The cavity 15d is intended to define a communication channel between the bowl outlet opening 13a and the piping 2a of the chamber through the flange 15b of casing 15. As shown more particularly in FIGS. 1 and 4, cavity 15d only opens at its top part in flange 15b, whereas its bottom part is closed by the portion 15'a of wall 15a which is pressed against the external wall of bowl 13.

It can thus be seen that the meter according to this invention combines the advantages of a metering chamber made of refractory material having a slight expansion with those of a machined product without the necessity of removing shavings.

Furthermore, the combination of the bowl 13 and the casing 15, the latter including in particular a cavity 15d, which is in communication with the bowl outlet opening 13a and which opens in the outlet piping of the chamber, through the flange 15b, enables chambers to be made without any internal partitioning, which affords the advantage that the latter can be molded in reusable molds.

I claim:

1. A volumetric meter for liquids of the oscillating disc type to which a nutation movement is imparted including a lower substantially hemispherical half-shell defining an annular flange, an open casing in said lower half-shell, said casing including a bounding wall having spherical generatrices, said casing including a marginal flange resting on the annular flange of the lower half-shell, said bounding wall of the casing defining a cavity opening in said marginal flange, a thin stamped bowl in said casing, said bowl having a conical bottom projecting upwards and a bounding wall having spherical generatrices pressed against the wall of said casing, said bowl having an inlet opening and an outlet opening both provided in the wall thereof, one of said openings coinciding with the cavity of said casing, a partition constituting a diaphragm supported between said two openings of the bowl to isolate them from each other, a cone-shaped oscillating disc in said bowl, said disc having a radial slot accommodating said partition, an upper substantially hemispherical half-shell constituting a cover and defining with said bowl a metering chamber, said upper half-shell being in tight engagement on the annular flange of said lower half-shell and pressing the marginal flange of the casing on said annular flange while also pressing said bowl against the wall of said casing, and totalizator means in the upper half-shell for being driven by said cone-shaped oscillating disc.

2. A volumetric meter as claimed in claim 1, wherein the bottom of said bowl has a spherical concavity with a center of curvature coinciding with the apex of the conical bottom of the bowl and also coinciding with the center of curvature of the bounding wall of said bowl, said cone-shaped disc having a conicity different from the conicity of said bottom of the bowl whereby two diametrically opposed generatrices of said disc respectively press against the conical bottom of said bowl and against said upper half-shell, said cone-shaped disc also including a spherical hub concentric with the spherical concavity of said bowl, said hub including a radial catch-pin engaged with the totalizator means to actuate the same.

3. A volumetric meter as claimed in claim 1, wherein the marginal flange of said casing has a varying width and a circular peripheral edge offset in relation to the center of the spherical generatrices defining the wall of said bowl, the widest part of said marginal flange coinciding with the cavity provided in said wall of the casing and opening into said flange thereby defining an outlet channel from the metering chamber.

4. A volumetric meter as claimed in claim 2, wherein said bowl has a first radial slot in the bottom thereof, and a second slot coplanar with said first slot in the wall of the bowl and wherein the partition constituting the diaphragm is a small plate including two projecting lugs respectively engaged in the said first and second slots, said small plate further including a third lug connected to the upper half-shell and a front face in the form of an arc of a circle bearing on the spherical hub of the oscillating disc.

5. A volumetric meter as claimed in claim 3, wherein said upper half-shell has a flat bottom defining, near the periphery thereof, a centering cavity for said bowl, the latter cavity also containing the marginal flange of said casing, said flat bottom having an upwardly extending cylindrical portion near the center thereof and a cavity of spherical shape in said cylindrical portion and having a center coinciding with the center of the concavity with spherical generatrices of the bottom of the bowl, whereby said hub of the disc is interposed between said bowl concavity and said cavity of the cylindrical portion of the bottom of the upper half-shell.

6. A volumetric meter as claimed in claim 5 comprising magnetic means of the fluid-tight type supported in the cylindrical portion on the bottom of the upper half-shell for providing driving connection between said hub of the disc and said totalizator means in the upper half-shell.

7. A volumetric meter as claimed in claim 1, wherein the lower shell includes an inlet duct for the introduction of liquid to be metered, and the upper shell includes an outlet duct for the discharge of metered liquid.

8. A meter for liquids comprising a pair of hemispherical shells connected together, one of said shells including a liquid inlet and the other a liquid outlet, means supported within the shells and defining a measuring chamber for the flow of liquid through the shells, said means including an outer casing and an inner bowl in said casing, said bowl and casing having complementary spherical walls in surface contact with one another, said bowl having an inlet opening and an outlet opening, said casing having an inlet opening in registry with the inlet opening of the bowl and in communication with the liquid inlet opening whereby liquid may enter the bowl, said casing having a cavity in the wall thereof in registry with the outlet opening in the bowl and in communication with the liquid outlet opening whereby liquid may be discharged from the bowl, disc means supported in said bowl for oscillating nutation movement under the action of the liquid flow, and totalizator means supported in the shells in operative association with the disc means for being driven thereby to provide a measurement of the quantity of liquid flowing through the shells.

9. A meter as claimed in claim 8, wherein said bowl and casing are stamped stainless steel elements.

10. A measuring chamber for a liquid meter comprising an open outer casing and an open internested inner bowl in said casing, said bowl and casing having spherical walls in engagement with one another, said bowl having an inlet opening and an outlet opening for liquid, said casing having an inlet opening in registry with the inlet opening in the bowl and a cavity in communication with the outlet opening whereby liquid may flow into the bowl through the inlet openings and liquid may flow out of the casing via the outlet opening in the bowl and the cavity in the casing, and a radial partition in the bowl between the inlet and outlet openings constituting a diaphragm separating said openings, means in said bowl for supporting an oscillating disc to which nutation movement is imparted, and means covering the casing and bowl and securing the same together, said casing including a lateral flange cooperating with said latter means and isolating the inlet openings and the cavity at the exterior of the casing, said cavity being in part formed in said flange.

References Cited by the Examiner

UNITED STATES PATENTS

| | | | |
|---|---|---|---|
| 427,486 | 5/1890 | Thomson | 73—258 X |
| 514,171 | 2/1894 | Thomson | 73—258 |
| 547,179 | 10/1895 | Nash | 73—258 |
| 2,127,195 | 8/1938 | White | 73—258 |
| 3,123,900 | 3/1964 | Millar | 29—157 |
| 3,208,132 | 9/1965 | Escher | 29—157 |

FOREIGN PATENTS

| | | |
|---|---|---|
| 9,346 | 4/1898 | Great Britain. |
| 16,819 | 7/1902 | Great Britain. |

RICHARD C. QUEISSER, *Primary Examiner.*

EDWARD D. GILHOOLY, *Assistant Examiner.*